United States Patent
Doree et al.

(10) Patent No.: US 10,873,609 B2
(45) Date of Patent: Dec. 22, 2020

(54) METHOD OF CONTROLLING A SESSION RELATED TO A SERVICE

(71) Applicant: Orange, Paris (FR)

(72) Inventors: Jose Doree, Lannion (FR); Jean-Claude Le Rouzic, Trebeurden (FR)

(73) Assignee: ORANGE, Paris (FR)

( * ) Notice: Subject to any disclaimer, the term of this patent is extended or adjusted under 35 U.S.C. 154(b) by 294 days.

(21) Appl. No.: 15/575,637

(22) PCT Filed: May 12, 2016

(86) PCT No.: PCT/FR2016/051126
§ 371 (c)(1),
(2) Date: Nov. 20, 2017

(87) PCT Pub. No.: WO2015/185118
PCT Pub. Date: Nov. 24, 2016

(65) Prior Publication Data
US 2018/0124126 A1    May 3, 2018

(30) Foreign Application Priority Data
May 18, 2015    (FR) .................................... 15 54429

(51) Int. Cl.
*G06F 15/16*    (2006.01)
*H04L 29/06*    (2006.01)

(52) U.S. Cl.
CPC ...... *H04L 65/1083* (2013.01); *H04L 65/1006* (2013.01); *H04L 65/1016* (2013.01); *H04L 65/1063* (2013.01); *H04L 65/1069* (2013.01)

(58) Field of Classification Search
USPC ......................................................... 709/227
See application file for complete search history.

(56) References Cited

U.S. PATENT DOCUMENTS 9,491,045 B2 *  11/2016  Kvernvik ............ H04L 41/0681
10,390,058 B2 *   8/2019  Karnik ................. H04L 45/302
2010/0211666 A1   8/2010  Kvernvik et al.
(Continued)

OTHER PUBLICATIONS

International Search Report dated Jun. 28, 2016 for corresponding International Application No. PCT/FR2016/051126, filed May 12, 2016.
(Continued)

*Primary Examiner* — Alicia Baturay
(74) *Attorney, Agent, or Firm* — David D. Brush; Westman, Champlin & Koehler, P.A.

(57) ABSTRACT

A method for controlling a session for providing a certain service, at least one data stream being associated with the session. The method includes: obtaining a session control policy from a session control message, or generating such a policy as a function of a type of the service, which session control policy is to be implemented in the event of at least one data stream being inactive, i.e. in the event of a data stream associated with the session not being set up, or being released prematurely; sending the session control policy in a session control message to a control entity in charge of implementing the session control policy; and on detecting inactivity of at least one data stream, implementing the session control policy.

19 Claims, 4 Drawing Sheets

(56) References Cited

U.S. PATENT DOCUMENTS

2016/0295252 A1* 10/2016 Karnik ............... H04N 21/2402
2018/0199384 A1* 7/2018 Mizikovsky .......... H04W 76/38

OTHER PUBLICATIONS

English translation of the International Written Opinion dated Sep. 27, 2017 for corresponding International Application No. PCT/FR2016/051126, filed May 12, 2016.
V. Fajardo et al. "Diameter Base Protocol", RFC 6733, Oct. 2012.
M. Handley et al., "SDP: Session Description Protocol", RFC 4566, filed Jul. 2006.
P. Calhoun et al., "Diameter Network Access Server Application", RFC 4005, Aug. 2005.
J. Rosenberg et al., "An Offer/Answer Model with the Session Description Protocol (SDP)", RFC 3264, Jun. 2002.
J. Rosenberg et al., "SIP: Session Initiation Protocol", RFC 3261, Jun. 2002.
European Telecommunications Standards Institute (ESTI) specification document TS 129 214 v.7.4.0, "Universal Mobile Telecommunications System (UMTS); Policy and charging control over Rx reference point (3GPP TS 29.214 version 7.4.0 Release 7)", Apr. 2008.
International Telecommunication Union, ITU-T H.248.1 "Series H: Audiovisual and Multimedia Systems Infrastructure of audiovisual services—Communication procedures, Gateway control protocol: Version 3", Mar. 2013.

* cited by examiner

METHOD OF CONTROLLING A SESSION RELATED TO A SERVICE

CROSS-REFERENCE TO RELATED APPLICATIONS

This Application is a Section 371 National Stage Application of International Application No. PCT/FR2016/051126, filed May 12, 2016, the content of which is incorporated herein by reference in its entirety, and published as WO 2016/185118 on Nov. 24, 2016, not in English.

FIELD OF THE DISCLOSURE

The invention lies in the field of managing media streams during a communication session between two entities, and it relates more particularly to a method of controlling a communication session relating to a service.

BACKGROUND OF THE DISCLOSURE

Several stream management methods are known in the prior art. In Internet protocol (IP) type networks, it is known in particular to combine the session description protocol (SDP) as defined in document RFC 4566 of the Internet engineering task force (IETF) with the session initiation protocol (SIP) as defined in document RFC 3261 likewise by the IETF, so as to set up, modify, or indeed terminate a multimedia communication session between two entities. In particular, the SDP protocol makes it possible to describe a set of data streams associated with one such multimedia communication session.

IETF document RFC 3264 entitled "An offer/answer model with the session description protocol" also describes a mechanism enabling two entities to use the SDP protocol in order to negotiate parameters relating to desired data streams for a session that is to be set up or modified. In that model, in order to set up or modify a session, a first entity submits an offer to a second entity, which offer is referred to as an "SDP offer" and is in the form of a session description. The offer comprises a list of media stream descriptions specifying, for each stream, in particular a type of medium (audio, video, text), a destination port number, a transport protocol, or indeed encoding information. The entity that submits the offer can thus inform the entity to which the offer is sent about the various media and characteristics (e.g. type of coding, required bandwidth, stream direction) associated therewith that it is capable of handling. The destination entity of the offer, e.g. as a function of the media and the codings that it is capable of handling, accepts the offer by sending an answer referred to as an "SDP answer" informing the entity that sent the offer about the media streams that it is capable of handling. The destination entity of the offer can also send a new offer to the first entity, e.g. corresponding to other media that it desires to add to the session. The two entities are thus equally capable of acting as the sender of an offer and as the destination of an offer. That offer/answer mechanism is also equally applicable to communications sessions involving more than two participants (e.g. a video conference having more than two participants).

While the session is being created, it is possible that certain streams might not be set up. Likewise, during a session, streams might be released in permanent or temporary manner, e.g. because of characteristics of the network (e.g. giving priority to certain streams) or because of incidents occurring in the network (e.g. a failure of equipment in the network, saturation of resources of the network).

Below, the terms "loss of stream" or "stream inactivity" are used interchangeably to designate the failure to set up or the premature release of a stream associated with a session. The inactivity of a stream may have a greater or lesser impact on the session with which the stream is associated. Depending on the type of service to which a session relates, a stream may be essential, or on the contrary it may be of little importance for maintaining or setting up the session.

In an IP multimedia subsystem (IMS) network, and in known manner, a proxy call server control function (P-CSCF) entity may request to be notified of events relating to a session relating to a service. The European Telecommunications Standards Institute (ESTI) specification document TS 129 214 v.7.4.0 makes provision in particular for the P-CSCF proxy entity to receive a re-authorization request (RAR) message including an "INDICATION_OF_LOSS_OF_BEARER" or "INDICATION_OF_RELEASE_OF_BEARER" field indicating that a stream is inactive. In the event of such a stream being inactive within the session, the state of the art nevertheless does not propose any session control mechanism that is adapted to the service proposed via the ongoing session or via the session that is to be set up.

SUMMARY

In a first aspect, the invention provides a method of controlling a session for providing a certain service, at least one data stream being associated with said session, the method comprising:
  obtaining a session control policy from a session control message, or generating such a policy as a function of a type of the service, which session control policy is to be implemented in the event of at least one data stream being inactive, i.e. in the event of a data stream associated with the session not being set up, or being released prematurely;
  sending the session control policy in a session control message to a control entity in charge of implementing the session control policy; and
  on detecting inactivity of at least one data stream, implementing the session control policy.

The control method thus makes it possible to obtain a session control policy relating to a service and to act on the ongoing session or the session that is to be set up, as a function of the type of that service. By way of example, the session control message may relate to a session between a calling entity and a called entity, which message may be received from the calling entity, from the called entity, or indeed from an intermediate entity of the network situated on the network path between the calling entity and the called entity. The method advantageously makes it possible to transmit the session control policy from an entity in charge of controlling the service (e.g. an application server (AS)) to a third-party entity (e.g. P-CSCF, user terminal) so that it can implement the session control policy. Where appropriate, the message may be generated directly by the entity in charge of controlling the service. The method makes it possible, in particular, for the actions that are to be implemented at session level in the event of detecting inactivity of a stream of the session to be subordinated to a policy that is obtained from or received by the entity in charge of controlling the service. It is thus possible to implement a session control policy that is adapted to the service provided by the session.

According to a particular characteristic, said session control policy belongs to the group comprising: immediate release of the session; deferred release of the session; maintaining the session; and attempting to reestablish a stream of the session.

Numerous session control policies can be envisaged and may be implemented by entities receiving the session control message. The method makes it possible to distinguish between the actions that are implemented as a function of the type of service provided by the session, and provides a way of controlling the session in the event of a stream being inactive that is more precise than merely taking account of the type of the stream. Depending on the proposed service, for a given type of stream, the stream being inactive may thus give rise to different session control policies.

The method thus makes it possible to implement a session policy adapted to the proposed service and to the stream that has been detected as being inactive. For example, when the service is a remote surveillance service comprising a video stream and an audio stream, and when the audio stream is considered as secondary compared with the video stream, inactivity of the audio stream advantageously leads to ensuring that the session is maintained, whereas inactivity of the video stream leads to an attempt to reestablish the video stream. In contrast, e.g. for a video conference service comprising a video stream, an audio stream, and a subtitling stream, the audio stream may be considered as essential for maintaining the service, and inactivity of that stream leads to the session being released in deferred manner or immediately.

According to a particular characteristic, said session control policy is defined by an attribute for describing a stream of the session and contained in an SDP offer or answer associated with the session control message.

Obtaining the control policy from an SDP offer or answer enables the method to be implemented easily. An SDP message may in particular be encapsulated easily in a control message of a higher protocol layer using the SDP protocol. There is no need to provide extensions to such a protocol in order to implement the method. For a control entity of the media gateway control function (MGCF) type, communicating with a media entity of the IP multimedia subsystem—media gateway (IMS-MGW) type via the H.248 protocol, it is possible for example to incorporate the SDP offer or answer containing the control policy directly in an H.248 resource control message. This ensures that the method is compatible with numerous protocols.

In addition, using an attribute to define the session control policy directly in the description of a stream contained in the SDP offer or answer facilitates reading this information.

According to a particular characteristic, said session control policy is contained in a header of the session control message.

Obtaining the session control policy from a header of the session control message makes it possible to group together all of the session control policies relating to the streams of a given session in a single location. It is in particular possible to predetermine the policies associated with the streams described in an SDP offer or answer without prior analysis of the SDP offer or answer.

Furthermore, there is no need to provide a special attribute in the SDP offer or answer in order to define a session control policy in the event of a stream being inactive. The method can thus be implemented with entities that generate SDP messages using known techniques.

According to a particular characteristic, said session control policy is implemented on detecting inactivity of a data stream belonging to the group comprising a multimedia stream and a control stream.

According to a particular characteristic, said session control message is an SIP message.

In a second aspect, the invention provides a control entity for controlling a session for providing a certain service, referred to as a "primary" control entity, in a communication network and comprising:
  an obtaining module and/or a generator module arranged to obtain a session control policy from a session control stream or to generate such a policy as a function of a type of the service, which session control policy is to be implemented in the event of at least one data stream being inactive, i.e. in the event of a data stream associated with the session not being set up or being released prematurely; and
  a sender module arranged to send the session control policy in a session control message to a control entity, referred to as a "secondary" control entity, which is in charge of implementing the session control policy.

According to a particular characteristic, the obtaining module is arranged to obtain the session control policy from an SDP offer or answer contained in the session control message, the session control policy being an attribute of a description of a session stream contained in the SDP offer or answer.

According to a particular characteristic, the obtaining module is arranged to obtain the session control policy from a header of the session control message.

In a third aspect, the invention provides a control entity, referred to as a "secondary" control entity, for controlling a session for providing a certain service in a communication network implementing session control signals, the secondary control entity comprising:
  a receiver module arranged to receive a session control policy to be implemented in the event of at least one data stream being inactive, i.e. in the event of a data stream associated with the session not being set up or being released prematurely; and
  an implementation module arranged to implement said session control policy.

According to a particular characteristic, the implementation module is arranged to execute or to order: immediate release of the session for providing a certain service; deferred release of the session for providing a certain service; maintaining the session for providing a certain service; or attempting to reestablish a stream of the session for providing a certain service.

According to a particular characteristic, the control entity of the third aspect further comprises a detector module arranged to detect inactivity of at least one stream of the session for providing a certain service.

In a fourth aspect, the invention provides a system for controlling a session for providing a certain service in a telecommunication network. Said system comprises:
  a control entity, referred to as a "primary" control entity, in accordance with any characteristic of the second aspect; and
  a control entity, referred to as a "secondary" control entity, in accordance with any characteristic of the third entity.

On detecting inactivity of at least one stream of a session for providing a certain service, the secondary control entity implements a session control policy received from the primary control entity for the session.

The advantages set out for the session control method of the first aspect are directly transposable to the control entities of the second and third aspects, and also to the control system of the fourth aspect.

In a fifth aspect, the invention also provides a program for a control entity, the program comprising program code instructions for controlling the execution of steps of the above-described session control method, when the program is executed by the control entity, and the method also provides a data medium readable by a control entity and storing a program for a control entity.

BRIEF DESCRIPTION OF THE DRAWINGS

The invention can be better understood from the following description of particular embodiments given with reference to the accompanying drawings, in which.

DETAILED DESCRIPTION OF ILLUSTRATIVE EMBODIMENTS

Figure 1:
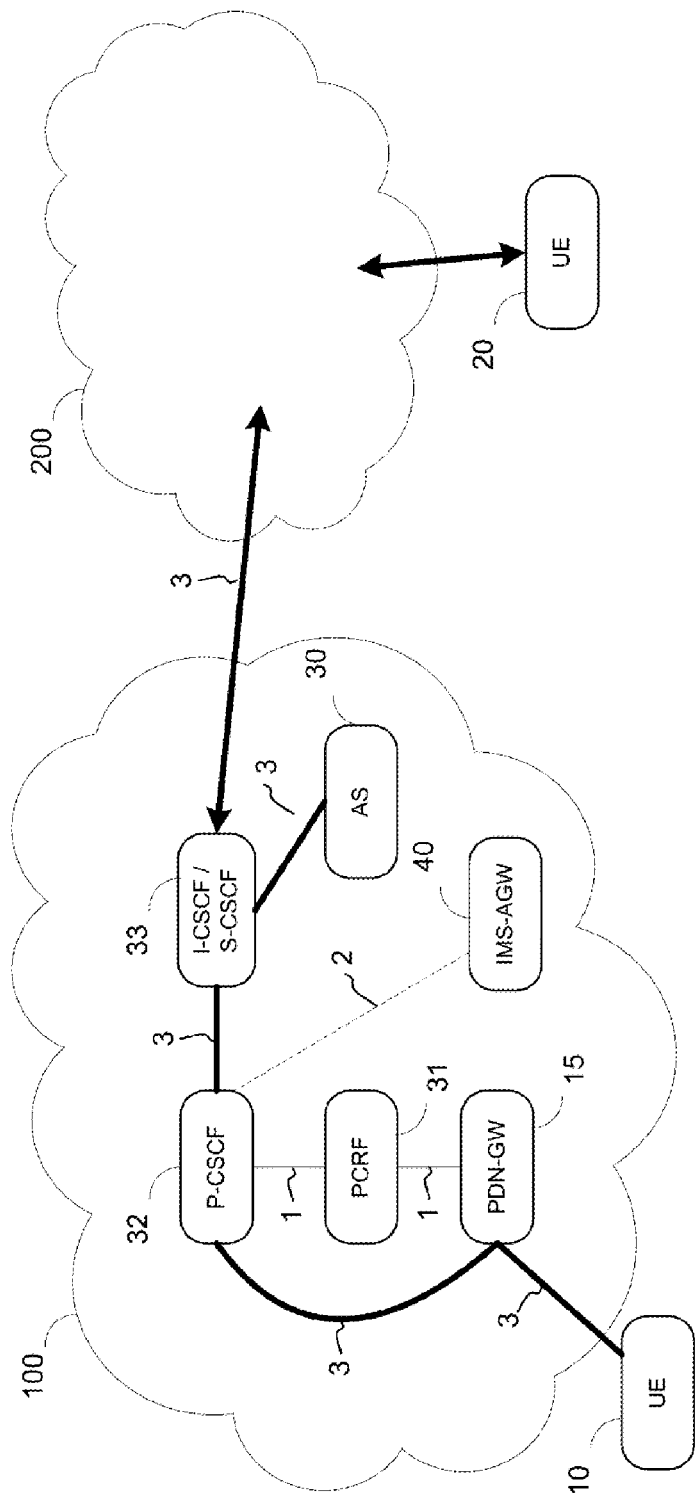
FIG. 1 shows an IP multimedia subsystem (IMS) communication network in a particular embodiment.

FIG. 1 shows an IMS communication network 100 in which control entities of the invention perform a method of controlling a session for providing a service between a calling entity 10 of the IMS communication network 100 and a called entity 20 of an IMS communication network 200. An IMS network architecture as defined by the 3rd generation partnership project (3GPP) standardization group enables sessions to be set up and controlled between two network entities, and also resources to be reserved for data streams in a data transport network. By means of this architecture, network operators can conveniently control the quality of service made available. The IMS architecture makes it possible to offer services of the telephone, videophone, presence, instant messaging, or television type and it also manages interaction between such services. It generally makes use of the session initiation protocol (SIP), as defined by the Internet engineering task force (IETF) in its document RFC 3261 as the protocol for managing sessions, thereby making it possible to set up, modify, and terminate sessions in a network that uses the IP protocol.

More particularly, the communication network 100 comprise control entities 30-33, a media entity 40, and an entity 15 that is both a media entity and a control entity. The control entities and the media entities are respectively entities suitable for processing signaling messages relating to the service provision session, and entities suitable for processing the transport of data relating to the service provision session. Control entities are said to belong to a control plane, while media entities are said to belong to a media plane.

By way of example, the control entity 30 is an application server (AS), the control entity 31 is a policy control and charging rules function (PCRF) entity, the control entity 32 is a proxy call server control function (P-CSCF) server, the control entity 33 is an entity that combines interrogating-call server control functions (I-CSCFs) and serving-call server control functions (S-CSCFs), the entity 15 that is both a media entity and a control entity is a packet data network-gateway (PDN-GW), and the media entity 40 is an IMS-access gateway (IMS-AGW).

The entities of the IMS communication network 100 are implemented to manage the session between the calling entity 10 and the called entity 20. The calling entity 10 is a subscriber of the IMS communication network 100, which it accesses via the PDN-GW gateway 15. The called entity 20 is a subscriber of the IMS communication network 200.

In the embodiment described, the control entity 32 serves as a connection entity between the core of the IMS communication network 100 and the access network used by the calling entity 10, and it is suitable for relaying all of the signaling messages between the calling entity 10 and the control entity 33. The control entity 32 also communicates with the media entity 40.

The control entity 33 serves in particular to interrogate a subscriber server (not shown) in order to manage the procedure for registering the calling entity 10. It also serves to make requests to the control entity 30 in order to implement one or more services associated with the service provision session.

The control entity 31 is in charge of adapting and controlling the use of the network resources of the communication network 100 by providing control rules for the session, e.g. as a function of the services required by the calling entity 10 or of its subscriber profile.

The exchanges respectively between: the calling entity 10 and the PDN-GW gateway 15; the PDN-GW gateway 15 and the control entity 32; the control entity 32 and the control entity 33; the control entity 33 and the control entity 30; and the control entity 33 and the IMS communication network 200 are SIP signaling messages 3.

The exchanges between firstly the control entity 31 and the control entity 32 and secondly the PDN-GW gateway 15 and the control entity 31 are implemented by diameter signaling messages 1 as defined in the IETF document RFC 6733.

The exchanges between the control entity 32 and the media entity 40 are carried by signaling messages 2 in accordance with the H.248 protocol defined by the ITU-T workgroup of the International Telecommunication Union (ITU).

The session control method is more particularly implemented by the control entities 30 and 32, which are referred to below respectively as the "primary" control entity and the "secondary" control entity. These entities form a control system for a session for providing a certain service. This is described in detail below with reference to FIG. 2.

It should also be observed that FIG. 1 is a simplified representation of the IMS communication network 100. No limitation should be attached to the number of control entities and media entities belonging to the IMS communication network 100.

The entities of the IMS communication network 200 are similar to those of the IMS communication network 100 and are not shown in order to avoid overburdening FIG. 1.

In another network configuration, certain control entities may also be grouped together within a single entity. Likewise, certain functions provided by a given entity may be dissociated and implemented by distinct entities. For example, this applies to the I-CSCF interrogation functions and the S-CSCF registration functions of the control entity 33.

In yet another network configuration, the session control method is implemented by entities located in the IMS communication network 100 and in the IMS communication network 200. In particular, the session control method does not require the entities implementing it to belong to the same communication network.

Figure 2A:
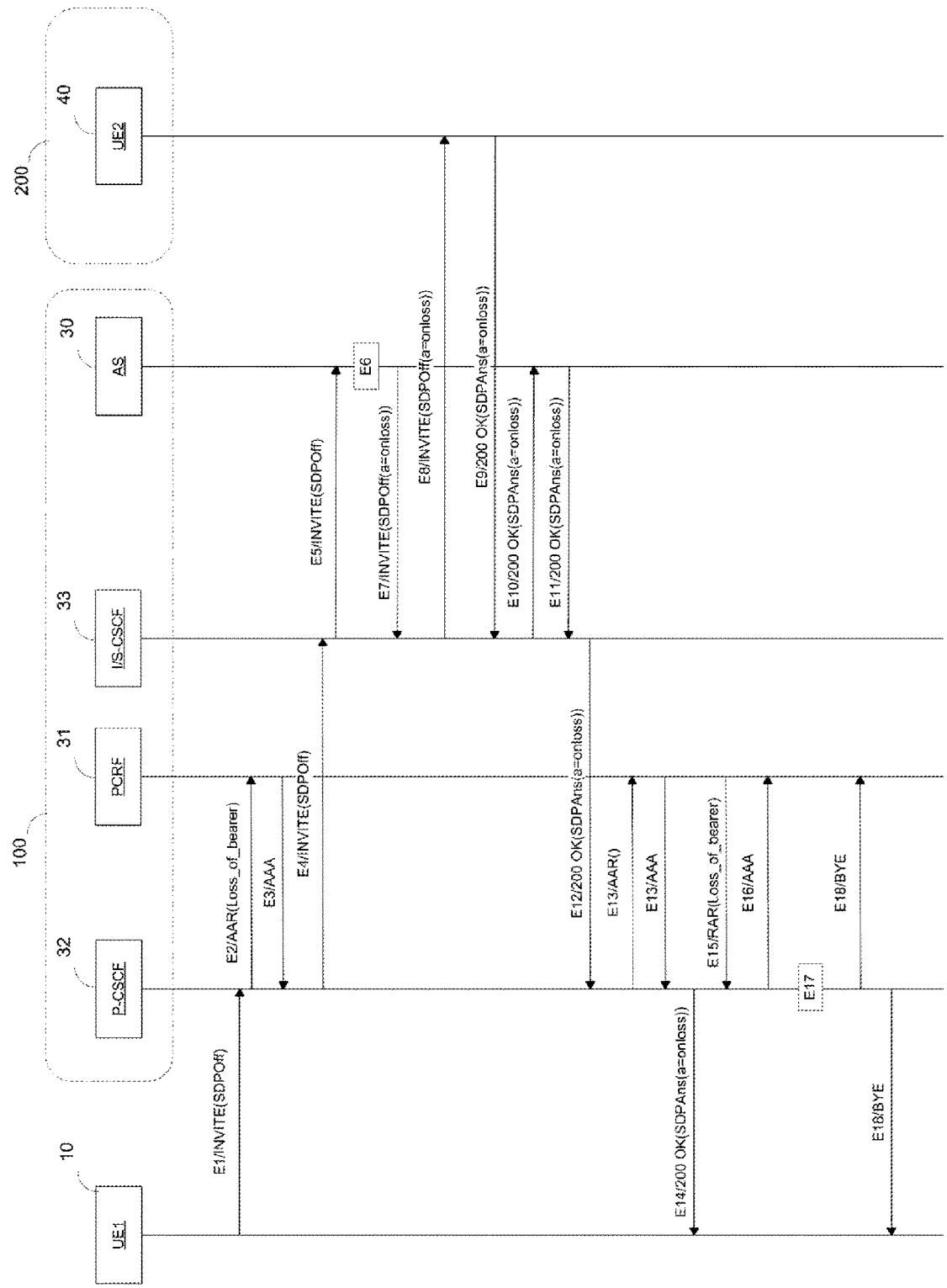
FIG. 2a shows steps of a method of controlling a session for providing a service, as implemented by entities of an IMS communication network of a first particular embodiment.

FIG. 2a shows steps of a method of controlling a session for providing a service as implemented by entities of an IMS communication network in a first particular embodiment. Below, it is assumed that the network is configured as described with reference to FIG. 1.

In this first embodiment, the service provision session is set up by way of example between the calling entity 10 (e.g. a call robot) of the IMS communication network 100 and a called entity 20 located in the IMS communication network 200 of a remote site. The session provides a service of remote surveillance of the remote site.

By way of example, the session comprises three data streams, namely: a video stream for transmitting images from the remote site under surveillance; an audio stream enabling ambient sound of the remote site under surveillance to be transmitted; and an instant messaging stream enabling firstly information obtained from various sensors located on the remote site under surveillance to be transmitted, and secondly enabling control messages to be transmitted from the calling entity 10 (e.g. causing an alarm to be triggered).

During a step E1, the calling entity 10 sends an "INVITE" SIP session control message comprising an SDP offer for the called entity 20 located in the IMS communication network 200. The purpose of this message is to set up a remote surveillance session between the calling entity 10 and the called entity 20. The "INVITE" SIP session control message that is sent may for example have the following content:

```
INVITE sip:user1@operator.com SIP/2.0
To: <sip:user1@operator.com>
From: <sip:user2@operator.com>;tag=786
Call-ID: 3413an89KU
Contact : <sip :...> ; +ServiceApplicationServerA
Content-Type: application/sdp
[...]
m=audio 49170 RTP/AVP 8
a=rtpmap:8 PCMU/8000
m=video 51372 RTP/AVP 31
a=rtpmap:31 H261/90000
m=message 51789 TCP/MSRP *
a=accept-types:text/plain
a=path:msrp://host.operator.com:51789/2s93i9ek2a;tcp
```

A header of the "INVITE" SIP session control message specifies more particularly that the session calling entity 10 is seeking to set up is a remote surveillance session. This is indicated by the "Contact" header of the "INVITE" SIP session control message, which contains the value "ServiceApplicationServerA".

The SDP offer contained in the "INVITE" SIP session control message also contains three data stream descriptions, each identified by the letter "m". The first description describes an audio stream, the second describes a video stream, and the third describes an instant messaging stream.

It should be observed that at this stage the "INVITE" SIP session control message does not contain any session control policy.

During a step E2, the secondary control entity 32 (a P-CSCF proxy server) receives the "INVITE" session control message sent by the calling entity 10. The secondary control entity 32 then sends a stream reservation request for each of the three streams given in the SDP offer to the control entity 31 (the PCRF rules control entity). The stream reservation request is more precisely an "AA-Request" (AAR) Diameter resource control message as defined in document RFC 4005. By way of example, the "AAR" Diameter resource control message has the following content:

```
Diameter Protocol
    Command Code: 265 AA
    ApplicationId: 3GPP Rx (16777236)
    ...
    AVP: Session-Id(263) 1=115 f=-...
    AVP :Specific-Action(513) val=
    INDICATION_OF_LOSS_OF_BEARER
    ...
    AVP: Media-Component-Description(517)
      AVP: Media-Component-Number(518) val=1
      AVP: Media-Type(520) val=AUDIO
      AVP Media-SubComponent (519)
            AVP: Flow-Number(509) val=1
      AVP Media-SubComponent (519)
            AVP : Flow-Usage(512) val=RTCP
            AVP: Flow-Number(509) val=2
    ...
    AVP: Media-Component-Description(517)
      AVP: Media-Component-Number(518) val=2
      AVP: Media-Type(520) val= VIDEO
      AVP Media-SubComponent (519)
            AVP: Flow-Number(509) val=1
      AVP Media-SubComponent (519)
            AVP : Flow-Usage(512) val=RTCP
            AVP: Flow-Number(509) val=2
    ...
    AVP: Media-Component-Description(517)
      AVP: Media-Component-Number(518) val=3
      AVP: Media-Type(520) val= MESSAGE
            AVP: Flow-Number(509) val=1
```

The "AAR" Diameter resource control message further contains an "INDICATION_OF_LOSS_OF_BEARER" field indicating that the secondary control entity 32 requests to be notified by the control entity 31 of loss of stream events.

During a step E3, the control entity 31 sends a message acknowledging the stream reservation request to the secondary control entity 32. This acknowledgment message is an "AA-Answer" (AAA) Diameter resource control message, as defined in the document RFC 4005.

During a step E4, the secondary control entity 32 relays the "INVITE" SIP session control message to the control entity 33 (the entity forming both the I-CSCF interrogation functions and the S-CSCF registration functions).

During a step E5, the control entity 33 receives the "INVITE" SIP session control message, and from its "Contact" header containing the value "ServiceApplicationServerA", it determines that a remote monitoring service is to be implemented. The control entity 33 then transmits the "INVITE" SIP session control message to the primary control entity 30 (AS application server).

During a step E6, the primary control entity 30 receives the "INVITE" SIP session control message and identifies the three data streams contained in the SDP offer. As a function of type of service, the primary control entity 30, e.g. with the help of a locally defined parameter setting, determines that the remote surveillance service cannot be provided without the real time transport protocol (RTP) video stream and the instant messaging stream, but that in contrast the audio stream or real time transport control protocol (RTCP) video stream are not required for maintaining such a session. By way of example, the parameter settings may be defined using a table storing certain types of service in association with possible actions in the event of inactivity of certain types of stream relating to those services. By way of example, such a table has the following format:

| Service_type | Stream_type | Stream_subtype | Session_policy |
|---|---|---|---|
| remote surveillance | audio | * | keep |
| remote surveillance | video | rtcp | keep |
| remote surveillance | video | rtp | retry |
| remote surveillance | message | * | release |
| video conference | audio | * | wait 30 |
| video conference | video | * | keep |
| video conference | message | * | keep |

The columns, "Service_type", "Stream_type", "Stream_subtype", and "Session_policy" relate respectively to a type of service provided by the session, a type of data stream possible for the service in question, a subtype for the stream in question, and a session control policy. A ("Service_type", "Stream_type", "Stream_subtype") triplet has a corresponding session control policy. This control policy is implemented for the session in the event of inactivity of the stream defined by the "Stream_type" and "Stream_subtype" columns. The session control policies belong to the group comprising: immediate release of the session (specified in the "Session_policy" column by the value "release"); deferred release of the session (indicated in the "Session_policy" column by the value "wait x" where x is a number of seconds prior to actually releasing the session); maintaining the session (indicated in the "Session_policy" column by the value "keep"); and attempting to set up a stream of the session once again (indicated in the "Session_policy" column by the value "retry"). The table thus specifies that for a remote surveillance service, the session must be maintained in the event of inactivity in any audio stream or in an RTCP video stream, must be released in the event of inactivity in any instant messaging stream, and that an attempt should be made to set the session up again in the event of inactivity in an RTP video stream. Likewise, for a video conference service, the table indicates that the session must be released after 30 seconds in the event of inactivity of any audio stream, but that it should be maintained in the event of inactivity of any instant messaging stream or video stream.

During a step E7, the primary control entity 30 adds to the SDP offer contained in the "INVITE" SIP session control message with an "a=on-loss" attribute that is inserted in the descriptions of the audio, video, and instant message streams. This attribute specifies the control policy to be implemented in the event of inactivity of the stream with which it is associated. Thus, the primary control entity 30 acts for each data stream, and as a function of the type of service provided, to generate a session control policy to be implemented in the event of that stream being inactive, i.e. in the event of the stream not being set up or being released prematurely. The "INVITE" SIP session control message then contains a new SDP offer. By way of example, the resulting "INVITE" SIP session control message may have the following content:

```
INVITE sip:user1@operator.com SIP/2.0
To: <sip:user1@operator.com>
From: <sip:user2@operator.com>;tag=786
Call-ID: 3413an89KU
Content-Type: application/sdp
...
m=audio 49170 RTP/AVP 8
a=on-loss : * keep
a=rtpmap:8 PCMU/8000
m=video 51372 RTP/AVP 31
a=on-loss : RTCP keep
```

-continued

```
a=on-loss : RTP release
a=rtpmap:31 H261/90000
m=message 51789 TCP/MSRP *
a=on-loss : * release
a=accept-types:text/plain
a=path:msrp://host.operator.com:51789/2s93i9ek2a;tcp
...
```

Once the session control policies have been generated and inserted in the "INVITE" SIP session control message, the primary control entity 30 returns the "INVITE" SIP session control message to the control entity 33.

During a step E8, the control entity 33 routes the "INVITE" SIP session control message to the called entity 20 of the IMS communication network 200.

During a step E9, a "200 OK" SIP session control message from the IMS communication network 200 is received by the control entity 33. This acknowledgement message contains an SDP answer having the same attributes as those contained in the above-described SDP offer. By way of example, the "200 OK" SIP session control message may have the following format:

```
SIP/2.0 200 OK
To: <sip:user1@operator.com>; tag=345
From: <sip:user2@operator.com>;tag=786
Call-ID: 3413an89KU
Content-Type: application/sdp
...
m=audio 21456 RTP/AVP 8
a=on-loss : * keep
a=rtpmap:8 PCMU/8000
m=video 35687 RTP/AVP 31
a=on-loss : RTCP keep
a=on-loss : RTP release
a=rtpmap:31 H261/90000
m=message 24879 TCP/MSRP *
a=on-loss : * release
a=accept-types:text/plain
a=path:msrp://host.operator.com:24879/SDHdfg234;tcp
...
```

During a step E10, the control entity 33 relays the "200 OK" SIP session control message to the primary control entity 30.

The primary control entity 30 receives the "200 OK" SIP session control message and in turn, during a step E11, returns it without modification to the control entity 33, which itself relays it during a step E12 to the secondary control entity 32 in charge of implementing said session control policy in the event of a stream of the service provision session being inactive.

During a step E13, after receiving the "200 OK" SIP session control message, the secondary control entity 32 issues a stream modification request to the control entity 31 in order to take account of the information contained in the "200 OK" SIP session control message, and in order to update the previously reserved streams. The stream reservation request is made in the same manner as in step E2, by sending an "AAR" Diameter resource control message.

During a step E14, the secondary control entity 32 transmits the "200 OK" SIP session control message to the calling entity 10. This entity is thus informed about the session control policies that may be implemented by the IMS communication network 100 in the event of a stream of the session being inactive. The calling entity 10 can advantageously make use in turn of the information obtained about the session control policies in order to interpret them locally, and for example make provision for special local processing in the event of the seconds being released as a result of a stream being detected as being inactive by the IMS communication network 100.

During a step E15, the control entity 31 detects that the instant messaging stream is inactive. By way of example, this inactivity may be determined by the expiry of a time delay after a predefined number of sessions, after which a stream is considered as being inactive if no data packet relating to that stream has been received. A message indicating that the stream is inactive is then sent by the control entity 31 to the secondary control entity 32. By way of example, this message may be a "RAR" Diameter message containing a "Specific-Action" field with the value "INDICATION_OF_LOSS_OF_BEARER", and indicating that a stream has been lost for the stream identified by the "Media-Component-Number" and "Flow-Number" fields, i.e. the instant messaging stream. By way of example, the Diameter message may have the following format:

```
Diameter Protocol
Command Code: 258 Re-AuthA
ApplicationId: 3GPP Rx (16777236)
...
AVP: Session-Id(263) 1=115 f=-...
AVP :Specific-Action(513) val=
INDICATION_OF_LOSS_OF_BEARER
...
AVP: Flows (510)
      AVP: Media-Component-Number(518) val=3
      AVP: Flow-Number(509) val=1
...
```

During a step E16, the secondary control entity 32 receives the "RAR" Diameter message and is thus notified of the loss of the instant messaging stream. The secondary control entity 32 acknowledges the received "RAR" Diameter message by sending an "AAR" Diameter message to the control entity 31.

During a step E17, the secondary control entity 32 implements the session control policy obtained from the SDP offer in step E12, and corresponding to the instant messaging stream being inactive. This session control policy consists more particularly in releasing the session, which is indicated by the "on-loss:*release" line in the description of the instant messaging stream contained in the SDP offer.

During a step E18, implementing the session control policy because of the instant messaging stream being inactive gives rise to the secondary control entity 32 sending a session closure message to the calling entity 10 and to the control entity 31.

In another embodiment, the session control policies are inserted directly in a header of an SIP session control message, e.g. a "Media-Loss-Actions" header, instead of in an SDP offer or answer contained in the message. The session control policies then correspond to an ordered list of values in which the order corresponds to the order of stream descriptions associated with the session in the SDP offer or answer contained in the SIP session control message. The values of the list then indicate a session control policy for each stream within the session in the order of the list. More precisely, an $n^{th}$ stream description of an SDP offer or answer corresponds to the $n^{th}$ session control policy of the list of values associated with the "Media-Loss-Actions" header. By way of example, an "INVITE" SIP session control message in this embodiment has the following form:

```
INVITE sip:user1@operator.com SIP/2.0
To: <sip:user1@operator.com>
From: <sip:user2@operator.com>;tag=786
Call-ID: 3413an89KU
Media-Loss-Actions: <* keep >, <rtp wait 30; rtcp keep>,
<tcp release; msrp keep>,< * keep>
Content-Type: application/sdp
v=0
o=user1 2890844526 2890844526 IN IP4 operator.com
s=
c=IN IP4 host.operator.example.com
t=0 0
m=audio 49170 RTP/AVP 0 8 97
a=rtpmap:0 PCMA/8000
a=rtpmap:8 PCMU/8000
a=rtpmap:97 iLBC/8000
m=video 51372 RTP/AVP 31
a=rtpmap:31 H261/90000
m=message 51789 TCP/MSRP *
a=accept-types:text/plain
a=path:msrp://host.operator.com:51789/2s93i9ek2a;tcp
m=application 64300 UDP/DTLS/SCTP webrtc-datachannel
a=setup:passive
a=sctp-port:6000
a=max-message-size: 100000
```

In another embodiment, in step E9, an entity of the IMS communication network 200 uses its SDP answer to specify attributes given values that are different from those contained in the SDP offer that it received. The IMS communication network 200 can thus propose session control policies that are different from those proposed or retained by a control entity of the IMS communication network 100.

In another embodiment, a session control policy is inserted by each calling entity 10 in the SDP offer sent in step E1. In step E6, the primary control entity 30 can then use predefined parameter settings to modify the session control policy defined in the SDP offer or indeed can conserve it as specified by the calling entity 10. Under such circumstances, the primary control entity 30 obtains the session control policy directly from the received "INVITE" SIP session control message.

In another embodiment, the primary control entity 30 and the secondary control entity 32 are a single entity. The control entity obtaining the session control policy from a session control message, or generating that policy is also the entity that implements it.

The method is described above for implementing a remote surveillance service, nevertheless there is no limit on the types of service that can benefit from session control.

Likewise, the method is described with an implementation in an IMS communication network 100. Nevertheless there is no limit on the number of communication networks in which the method can be implemented. By way of example, the method can easily be implemented with control entities spread among a plurality of distinct networks.

Furthermore, there is no limit as to the control entities that might implement the method described. By way of example, such a control entity may belong to the following group of control entities: a proxy call server control function (P-CSCF) entity; an interrogating call server control function (I-CSCF) entity; a serving call server control function (C-CSCF) entity; an application server (AS) entity; a media gateway controller function (MGCF) entity; an interconnection border control function (IBCF) entity; and a user terminal.

The above embodiments are described for processing an "INVITE" SIP session control message and a "200 OK" SIP correspondent answer message. Nevertheless, there are no limits on the types of service request that can be processed.

The processing method that is implemented by way of example for an "UPDATE" SIP request is equivalent to the method implemented for processing an "INVITE" SIP request.

Figure 2B:
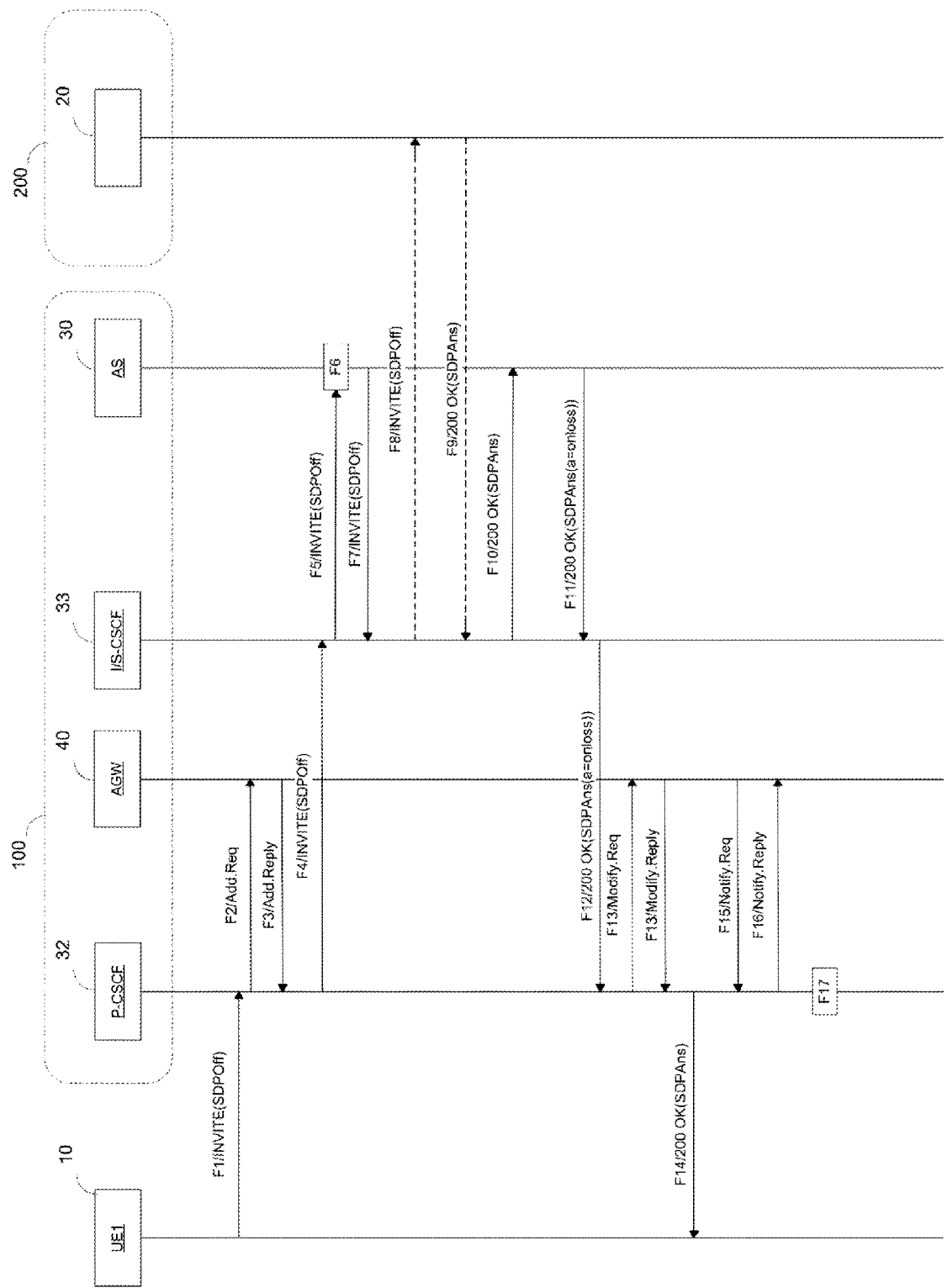
FIG. 2b shows steps of a method of controlling a session for providing a service, as implemented by entities of an IMS communication network in a second particular embodiment.

FIG. 2b shows the various steps of a method of controlling a service provision session as implemented by entities of an IMS communication network in a second particular embodiment. Below the context is once more a network configuration as described with reference to FIG. 1.

In this second embodiment, like the embodiment described above with reference to FIG. 2a, the service provision session is a session providing a remote surveillance service set up between the calling entity 10 (e.g. a call robot) of the IMS communication network 100 and a called entity 20 located in the IMS communication network 200 of a remote site. As above, it is assumed that the session comprises three data streams: a video stream, an audio stream, and an instant messaging stream.

Unlike the first embodiment, the entity detecting that a stream is inactive and notifying the secondary control entity 32 is a media entity 40, e.g. an IMS-AGW gateway. The other entities are identical to the first embodiment.

During a step F1 identical to the above-described step E1, the calling entity 10 sends an "INVITE" SIP session control message containing an SDP offer for the called entity 20 located in the IMS communication network 200.

During a step F2, the secondary control entity 32 receives the "INVITE" session control message sent by the calling entity 10. The secondary control entity 32 then sends a stream reservation request for each of the three data streams of the SDP offer, to the control entity 40. The stream reservation request is more precisely an "Add Request" H.248 resource control message as defined in the ITU-T document H.248.1. By way of example, the "Add Request" H.248 resource control message may have the following content:

```
MEGACO/2 [172.20.214.26]:2953
Transaction=14289{
Context=63967{
Add=Term1{
Media{
Stream=1{
LocalControl{ event=1111{adid/ipstop{dt=60}}...
Local{
v=..
c=...
m=audio ...
...
}}
Stream=2{
LocalControl{ event=2222{adid/ipstop{dt=60}}...
Local{
v=..
c=...
m=video ...
...
}}
Stream=3{
LocalControl{ event=3333{adid/ipstop{dt=60}}...
Local{
v=..
c=...
m=message ......
}}
}},
...
```

The "Add Request" H.248 resource control message further comprises, for each stream, an "adid/ipstop{dt=60}" indication specifying that the secondary control entity 32 is requesting to be notified by the control entity 40 of stream loss events. More precisely, a stream is considered as being lost when no packet relating to that stream is received during a period of 60 seconds.

During a step F3, the control entity 40 sends a "Add Reply" H.248 resource control message acknowledging the stream reservation request to the secondary control entity 32.

Steps F4 to F6 are then implemented. These steps are identical to steps E4 to E6 as described above with reference to FIG. 2a.

During a step F7, unlike in the first embodiment, the primary control entity 30 does not add to the SDP offer contained in the "INVITE" SIP session control message using policies determined at the preceding step for session control in the event of a stream being inactive. The primary control entity 30 returns the "INVITE" SIP session control message to the control entity 33 without modifying it. Advantageously, this makes it possible to avoid communicating the session control policies to the communication network of the called entity 20.

Steps F8 to F10 are then implemented in similar manner to steps E8 to E10 as described above with reference to FIG. 2a, except that the SIP session control messages that are exchanged do not include session control policies for use in the event of stream inactivity.

During a step F11, after it has received a "200 OK" SIP session control message containing an SDP answer from the IMS communication network 200, the primary control entity 30 adds to this SDP answer with an "a=on-loss" attribute that is inserted in the descriptions of the audio, video, and instant messaging streams. This attribute gives the control policies to be implemented in the event of inactivity in the stream with which it is associated. Thus, for each data stream, and as a function of the type of service provided, the primary control entity 30 generates a session control policy to be implemented in the event of inactivity of this stream, i.e. in the event of the stream not being established or of it being released prematurely. The session control policies for use in the event of a stream being inactive in this second embodiment are inserted on reception of the SDP answer and thus make it possible to reserve confidentiality about such policies with respect to the IMS communication network 200. Thereafter, the control entity 30 sends the modified SIP message to the control entity 33, which in turn relays it during a step F12 to the secondary control entity 32 in charge of implementing the session control policy in the event of a stream in the service provision session being inactive. This step F12 is identical to the step E12 of the first embodiment.

During a step F13, after receiving the "200 OK" SIP session control message, the secondary control entity 32 sends a stream modifying request to the media entity 40 in order to take account of the information contained in the "200 OK" SIP session control message, and in order to update the previously reserved streams. The stream reservation request is made in similar manner to step F2, by sending a "Modify Request" H.248 resource control message.

The secondary control entity 32 acts during a step F14 that is identical to the step E14 of the first embodiment, to transmit the "200 OK" SIP session control message to the calling entity 10.

During a step F15, the media entity 40 detects that the audio stream is inactive. This inactivity is determined by a timeout predefined at 60 seconds in F2 expiring. A message indicating that the stream is inactive is then sent by the media entity 40 to the secondary control entity 32. This message is more precisely a "Notify Request" H.248 message indicating that a loss of stream has occurred for the audio stream identified by the attribute "Stream=1". The "Notify Request" H.248 message may for example have the following format:

```
MEGACO/2 [172.20.214.23]:2953
Transaction=4214{
Context=63967{
Notify=Term1{
Media{
Stream=1{
LocalControl{ ObservedEvents=1111{20150315T22000000 :
adid/ipstop}...
...}}
```

During a step F16, the secondary control entity 32 receives the "Notify Request" H.248 message and is thus notified that the audio stream has been lost. The secondary control entity 32 acknowledges the "Notify Request" H.248 message that it has received by sending a "Notify Reply" H.248 message to the media entity 40.

During a step F17, the secondary control entity 32 implements the session control policy obtained from the SDP answer, and corresponding to inactivity of the audio stream. This session control policy consists more particularly in maintaining the session, which is indicted by the line "on-loss:*keep" in the description of the audio stream contained in the SDP answer. The session control policy that is implemented thus amounts to taking no account of the loss of the audio stream.

Figure 3:
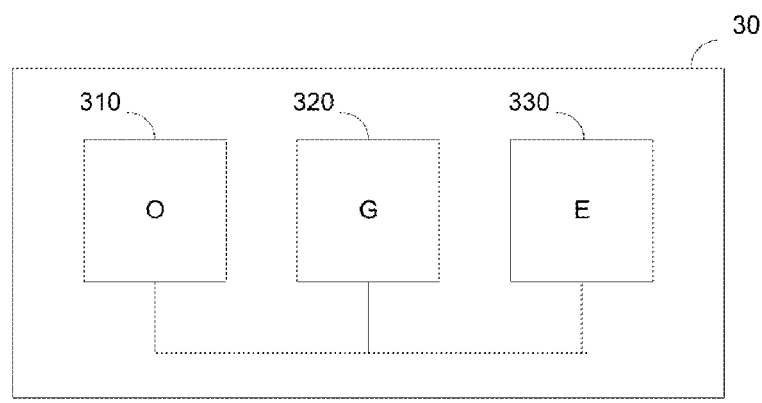
FIG. 3 shows a control entity referred to as a "primary" control entity, in a particular embodiment.

FIG. 3 shows a control entity 30 of a session for providing a certain service, referred to as a "primary" control entity. The primary control entity 30 comprises:

an obtaining module 310 and/or a generator module 320 arranged to obtain a session control policy from a session control message or to generate such a policy as a function of the type of said service, which session control policy is to be implemented in the event of inactivity of at least one data stream, i.e. in the event of a data stream associated with the session not being set up or being released prematurely; and a sender module 330 arranged to send the session control policy in a session control message to a control entity 31 referred to as a "secondary" control entity, that is in charge of the session control policy.

In a particular embodiment, the obtaining module 310 is arranged to obtain the session control policy from an SDP offer or answer contained in the session control message, the session control policy being an attribute of a description of a stream of the session contained in the SDP offer or answer.

In another particular embodiment, the obtaining module 310 is arranged to obtain the session control policy from a header of the session control message.

Figure 4:
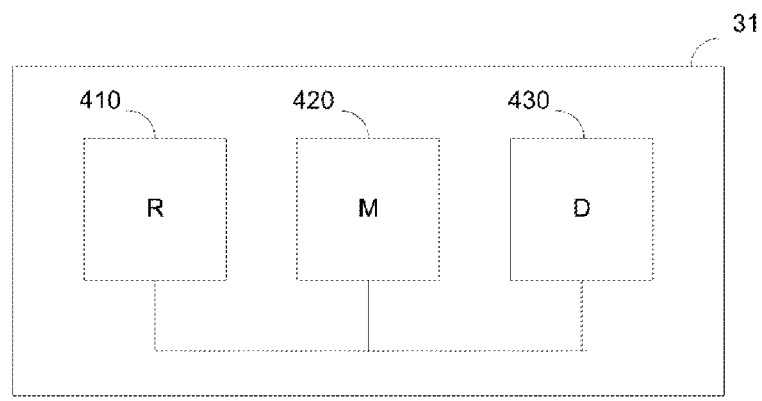
FIG. 4 shows a control entity, referred to as a "secondary" control entity, in a second particular embodiment.

FIG. 4 shows an entity 31, referred to as a "secondary" control entity. This entity implements session control signals. The control entity 31 comprises:

a receiver module 410 arranged to receive a session control policy to be implemented in the event of at least one data stream being inactive, i.e. in the event of a data stream associated with the session not being set up or being released prematurely; and an implementation module 420 arranged to implement the session control policy.

In a particular embodiment, the implementation module 420 is arranged to execute or to order immediate release of the session for providing a certain service; deferred release of the session for providing a certain service; maintaining the session for providing a certain service; or attempting to reestablish a stream of the session for providing a certain service.

In another particular embodiment, the control entity 31 also includes a detector module 430 arranged to detect inactivity of at least one stream of the session for providing a certain service.

The invention is implemented by means of software and/or hardware components. On these lines, the term "module" in this document may correspond equally well to a software component, to a hardware component, or to a set of hardware and/or software components, suitable for implementing a function or a set of functions, as described above for the module in question.

A software component comprises one or more computer programs, one or more subprograms of a program, or more generally any element of a program or of software. Such a software component is stored in memory and then loaded and executed by a data processor of a physical entity and is suitable for accessing the hardware resources of the physical entity (memories, storage media, communication bus, input/output electronic cards, user interfaces, etc.).

In the same manner, a hardware component corresponds to any element of hardware. It may be an optionally programmable hardware component, with or without an integrated processor for executing software. By way of example, it may be an integrated circuit, a smart card, an electronic card for executing firmware, etc.

In a particular embodiment, the modules 310, 320 and 330 are arranged to implement the above-described control method. They are preferably software modules comprising software instructions for executing those steps of the above-described control method, implemented by a primary control entity. The invention thus also provides:

a program for a primary control entity, comprising program code instructions for controlling the execution of the above-described control method when said program is executed by said primary control entity; and a data medium readable by a primary control entity and storing the program for a primary control entity.

Likewise, the modules 410, 420, and 430 are arranged to implement the above-described control method. They are preferably software modules comprising software instructions for executing steps of the above-described control method that are implemented by a secondary control entity. The invention thus also provides:

a program for a secondary control entity, including program code instructions for controlling the execution of steps of the above-described control method when said program is executed by said secondary control entity; and a data medium readable by a secondary control entity and storing the program for a secondary control entity.

The software modules may be stored in or transmitted by a data medium. The medium may be a hardware storage medium, e.g. a compact disk read only memory (CD-ROM), a magnetic floppy disk, or a hard disk, or may be a transmission medium such as an electrical, optical, or radio signal, or a telecommunications network.

An exemplary embodiment of the invention remedies insufficiencies and/or drawbacks of the prior art and/or provides improvements thereto.

Although the present disclosure has been described with reference to one or more examples, workers skilled in the art will recognize that changes may be made in form and detail without departing from the scope of the disclosure and/or the appended claims.

The invention claimed is:

1. A method of controlling a session for providing a service between two devices, at least one data stream being associated with said session, the method comprising, following sending a session control message by one device among said two devices toward the other device:
- inserting in said session control message a session control policy to be implemented in the event of a data stream associated with the session being inactive, said session control policy being inserted in said session control message by said one device or being generated by a primary control entity as a function of a type of said service and inserted in said session control message by said primary control entity, said primary control entity being located on a network path between said two devices, said inactivity of said data stream including a non-establishment or a premature release of the data stream;
- obtaining said session control policy in said session control message or in a response from said other device, by a secondary control entity in charge of implementing said session control policy, said secondary control entity being located on the network path between the two devices and being distinct from the primary control entity; and
- on detecting inactivity of the data stream, implementing said session control policy by the secondary control entity.

2. The method according to claim 1, wherein said session control policy belongs to the group consisting of: immediate release of the session; deferred release of the session; maintaining the session; and attempting to reestablish a stream of the session.

3. The method according to claim 1, wherein said session control policy is defined by an attribute for describing the data stream of the session and contained in an SDP offer or answer associated with the session control message.

4. The method according to claim 1, wherein said session control policy is contained in a header of the session control message.

5. The method according to claim 1, wherein said data stream being inactive belongs to the group consisting of a multimedia stream and a control stream.

6. The method according to claim 1, wherein said session control message is an SIP message.

7. The method according to claim 1, wherein the session control policy is adapted to the data stream.

8. A primary control entity in a communication network for controlling a session for providing a service between two devices, at least one data stream being associated with said session, said primary control entity being on a network path between said devices and comprising:
- a processor; and
- a non-transitory computer-readable medium comprising instructions stored thereon, which when executed by the processor configure the primary control entity to perform acts comprising:
  - following a session control message being sent by one device among said two devices toward the other device: performing:
    - inserting in said session control message a session control policy to be implemented in the event of a data stream associated with the session being inactive, said session control policy being generated by the primary control entity as a function of a type of said service, or
    - obtaining the session control policy from the session control message sent by the one device, the session control message having been inserted into the session control message by the one device;
    - said inactivity of said data stream including a non-establishment or a premature release of the data stream; and
  - sending the session control policy in the session control message to a secondary control entity, which is in charge of implementing said session control policy, said secondary control entity being located on the network path between the two devices and being distinct from the primary control entity.

9. The primary control entity according to claim 8, wherein s said session control policy is obtained from an SDP offer or answer contained in the session control message, said session control policy being an attribute of a description of a session stream contained in said SDP offer or answer.

10. The primary control entity according to claim 8, wherein said session control policy is obtained from a header of the session control message.

11. The primary control entity according to claim 8, wherein the session control policy is adapted to the data stream.

12. A secondary control entity in a communication network implementing and configured to use session control signals for controlling a session for providing a service between two devices, at least one data stream being associated with said session, the secondary control entity being on a network path between said devices and comprising:
- a processor; and
- a non-transitory computer-readable medium comprising instructions stored thereon, which when executed by the processor configure the secondary control entity to perform acts comprising:
  - receiving a session control policy in a session control message sent by one of the devices to the other device, said session control policy configured to be implemented in the event of at least one data stream associated with the session being inactive, said inactivity of said data stream including a non-establishment or a premature release of the data stream, said session control policy having being obtained or generated by a primary control entity, said primary control entity being located on the network path between the two devices and being distinct from the secondary control entity; and
  - implementing said session control policy upon detection of an inactivity of the data stream.

13. The control entity according to claim 12, wherein said implementing comprises executing or ordering immediate release of said session for providing the service; deferring release of said session for providing the service; maintaining said session for providing the service; or attempting to reestablish a stream of said session for providing the service.

14. The control entity according to claim 12, wherein the instructions configure the secondary control entity to perform further acts comprising detecting the inactivity of the at least one stream of said session for providing the service.

15. The secondary control entity according to claim 12, wherein the session control policy is adapted to the data stream.

16. A system for controlling a session for providing a service between two devices in a communication network, at least one data stream being associated with said session, the system comprising:
- a primary control entity located on a network path between said two devices and comprising:
  - a first processor; and
  - a first non-transitory computer-readable medium comprising instructions stored thereon, which when executed by the processor configure the primary control entity to perform acts comprising:
    - following a session control message being sent by one device among said two devices toward the other device:
      - obtaining from said session control message a session control policy to be implemented in the event of a data stream associated with the session being inactive, or
      - generating the session control policy by the primary control entity as a function of a type of said service and inserting the session control policy into the session control message,
    - said inactivity of said data stream including a non-establishment or a premature release of the data stream; and
- a secondary control entity, which is located on the network path between the two entities and is distinct from the primary control entity, the secondary control entity comprising:
  - a second processor; and
  - a second non-transitory computer-readable medium comprising instructions stored thereon, which when executed by the processor configure the secondary control entity to perform acts comprising:
    - obtaining said session control policy in said session control message or in a response from said other device; and
    - on detecting inactivity of the data stream, implementing said session control policy.

17. The system according to claim 16, wherein the session control policy is adapted to the data stream.

18. A non-transitory computer-readable data medium comprising program code instructions stored thereon for controlling in a communication network a session for providing a service between two devices, when the instructions are executed by a processor of a primary control entity, at least one data stream being associated with said session, wherein the instructions configure the primary control entity to perform acts comprising:
- following a session control message being sent by one device among said two devices to toward the other device:
- performing:
  - inserting in said session control message a session control policy to be implemented in the event of a data stream associated with the session being inactive, said session control policy having been generated by the primary control entity as a function of a type of said service, or
  - obtaining the session control policy from the session control message sent by the one device, the session control message having been inserted into the session control message by the one device;
  - said inactivity of said data stream including a non-establishment or a premature release of the data stream, said primary control entity being located on a network path between said two devices; and
- sending said session control policy in the session control message or in a response to said session control message to a secondary control entity in charge of implementing said session control policy, said secondary control entity being located on the network path between the two devices and being distinct from the primary control entity.

19. The non-transitory computer-readable data medium according to claim 18, wherein the session control policy is adapted to the data stream.

* * * * *

UNITED STATES PATENT AND TRADEMARK OFFICE
CERTIFICATE OF CORRECTION

Page 1 of 1

PATENT NO.         : 10,873,609 B2
APPLICATION NO.    : 15/575637
DATED              : December 22, 2020
INVENTOR(S)        : Jose Doree et al.

It is certified that error appears in the above-identified patent and that said Letters Patent is hereby corrected as shown below:

In the Claims

In Claim 12, Column 18, Line 31:
Please delete the word "implementing".

In Claim 12, Column 18, Line 48:
Please delete the word "having".

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*